United States Patent [19]

Klootwyk

[11] 4,188,462

[45] Feb. 12, 1980

[54] POWER MODULE ASSEMBLY WITH MONOPOLAR CELLS

[75] Inventor: Ronald I. Klootwyk, San Jose, Calif.

[73] Assignee: The Continental Group, Inc., New York, N.Y.

[21] Appl. No.: 955,564

[22] Filed: Oct. 30, 1978

[51] Int. Cl.² ............................................. H01M 2/38
[52] U.S. Cl. ........................................ 429/68; 429/70
[58] Field of Search .................................. 429/67–70, 429/72–81, 119

[56] References Cited

U.S. PATENT DOCUMENTS

| | | | |
|---|---|---|---|
| 3,505,113 | 4/1970 | Merten et al. | 429/70 X |
| 3,536,535 | 10/1970 | Lippincott | 429/68 |
| 3,779,813 | 12/1973 | Rabut | 429/70 |
| 4,052,541 | 10/1977 | Krusenstierna | 429/68 X |
| 4,053,685 | 10/1977 | Rowley et al. | 429/68 |

Primary Examiner—Charles F. LeFevour
Attorney, Agent, or Firm—Charles E. Brown

[57] ABSTRACT

A power module assembly of the electrochemical battery type. The assembly is formed of a plurality of individual monopolar cells which are mounted in stacked relation between a pair of end plates. Each cell is generally self-contained except for the electrolyte supply, and includes a slidably mounted anode which is held in constant contact with a cathode plate by a pressure bag assembly. The side faces of the anode are sealed against electrolyte flow so as to segregate adjacent cells against power robbing eddy currents.

15 Claims, 4 Drawing Figures

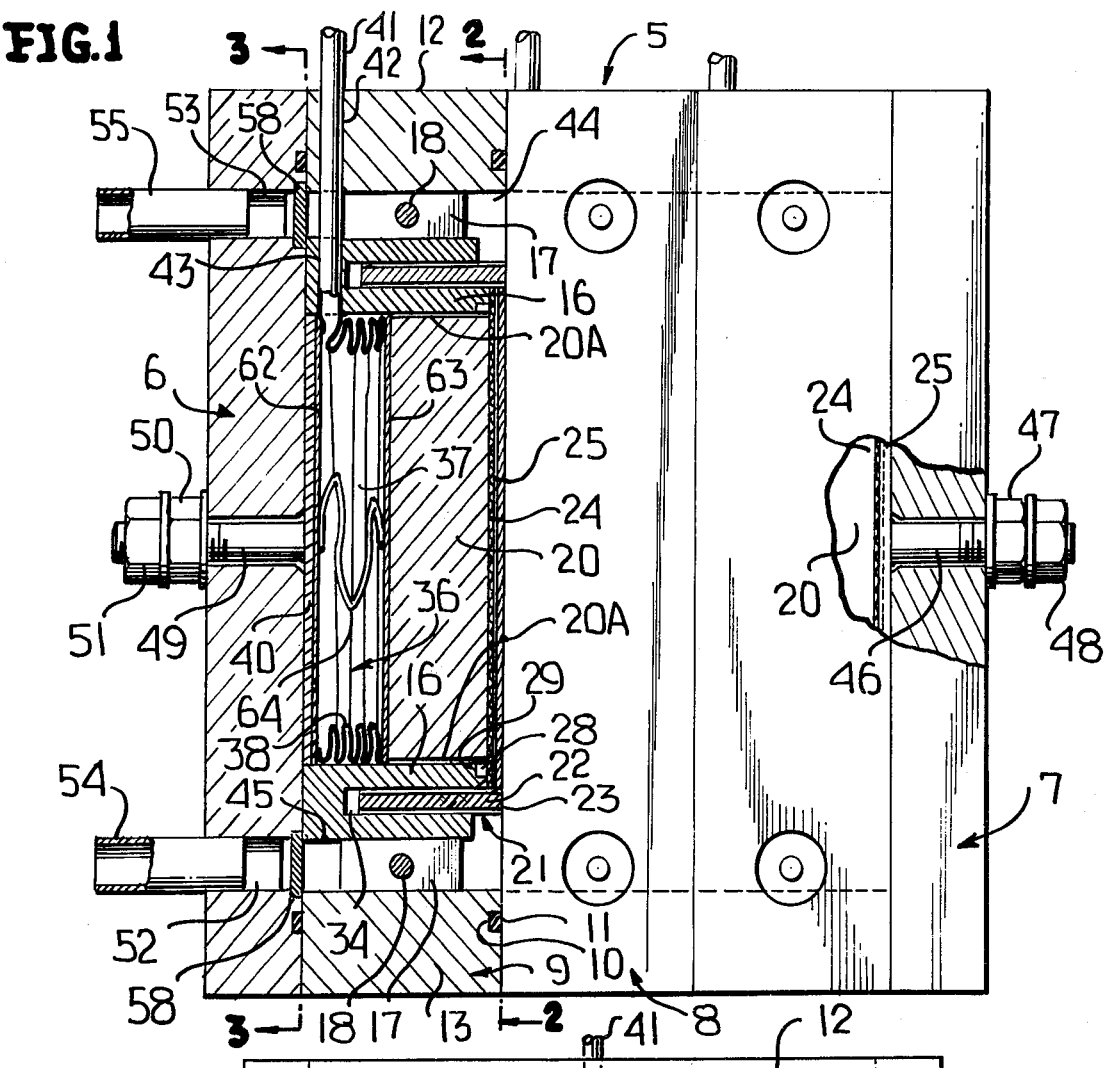
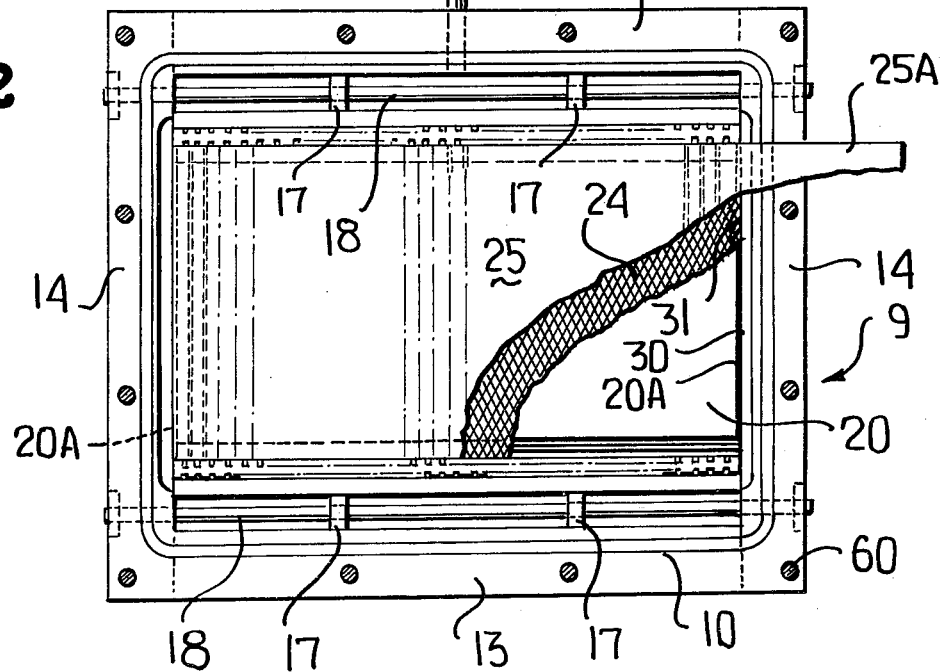

POWER MODULE ASSEMBLY WITH MONOPOLAR CELLS

This invention relates in general to new and useful improvements in power modules, and more particularly to power modules of the electrochemical battery type wherein anodes and cathodes are arranged in stacked relation where pressure is exerted to maintain a uniform pressure contact between the anodes and cathodes and where electrolyte flow between the anode and cathode occurs in all operating stages of the power module.

In power modules of the general type to which this invention relates, normally the anodes and cathodes are arranged in stacked relation within a single overall case and the required electrolyte is flowed across the contacting faces of adjacent anodes and cathodes. Also, the stack of anodes and cathodes are maintained in pressure contact by means of a single pressure element located at one end of the stack. Such power module assemblies, while they do perform, have certain undesirable drawbacks.

Shunt losses are a source of lost power. In existing bipolar modules a very complicated, and to this date, unreliable system of pressurized floating side walls, shunt curtains, and shunt manifolds are used to reduce these losses. Also, as the lithium or like material anode is consumed, the shunt paths are decreased.

In the module of this invention the shunt losses are reduced by a single fixed set of flow manifolds. By fixing the flow manifold the shunt suppression system becomes considerably more reliable. A more compact module is also obtained because in this module the shunt manifolds are horizontal which reduces the overall vertical height of the module.

In the bipolar module a major part of the electrolyte flow distribution is obtained by a pressure drop in the shunt manifold. A 1.0 PSI pressure drop which provides both acceptable shunt losses and good flow distribution causes an extreme hardship on the shunt curtains which to date have shown a tendency to deform and leak at the edges when shunt manifolds designed with a 1.0 PSI pressure drop are used.

In this module the allowable pressure drop in the shunt manifolds can be any desired value, because the shunt curtains and the prior pressurized floating side walls are not needed. This allows optimum design of flow distribution and shunt suppression.

Each cell in the bipolar module is a single unit composed of a block of lithium or like anode material which is pressed onto a cathode plate. The cathode plate is a grooved carbon steel plate which has the platinum plated cathode screen welded to it plus the previously mentioned shunt suppression system. This cathode plate is not cheap and that assembly must be returned for relithiating and refurbishing. Refurbishing requires replacement of the shunt curtain plus a physical inspection to verify the varnolyte coating is still intact and that no physical damage has occurred in the handling and shipment of the relatively delicate cathode plate and screen from the field operation.

In the module of this invention the cathode is permanently fixed in the module case and should never be removed. The lithium is pressed onto an expendable carbon steel plate of insignificant cost. The user therefore saves not only on the quantity of cathode plates required to support a program, but also on the refurbish and inventory problems.

In the bipolar module the electrodes are assembled in a stack. This can be done by placing each individual electrode in the module case (as presently done) or assembled in a rack and then the entire assembly of electrodes pushed into the module case. Past history has shown that the shunt curtain has a tendency to become lodged between the anode surface and the adjoining cathode screen. This renders that electrode useless and seriously reduces the performance of the module. In the module of this invention, operator error is not possible as the module has no curtains. The compression system is simply pushed (or vacuum pulled) back, and the anodes replaced on an individual basis.

The bipolar module uses a rubber bag for compression of the stack. It is adequate, but as in the case of any thin rubber product that must be handled each time the module is reloaded, it is susceptible to being damaged on assembly. This damage could go undetected until the module is required to operate.

In the module of this application a rubber bag could also be used. If a rubber bag is used, it should be realized that the bag will not be removed from the module, thus not subject to operator damage. However, a much more reliable metal bellows could be used for compression as well as electrical current conduction through the module.

It should be noted that a metal bellows is not suitable for bipolar power modules which exceed about 12 inches of stroke. Experience has shown the squirm and the spring constant of the bellows are a real problem, and beyond about 12 inches of stroke serious conflicting engineering requirements exist. In the proposed design each bellows only travels 1.6 inches (or the thickness of one anode) and therefore is not subject to the above mentioned limits.

Single electrode tests using 1.6 inch anodes have been successfully operated for 24 to 26 hours. In the bipolar design module the operating time of multiple 1.6 inch anodes is about half that of the single electrode duration. The module of this invention is essentially a series of single electrodes.

In the bipolar electrode stack sometimes one or more electrodes do not perform (low or zero voltage output). In the module of this invention single module voltage is easily monitored and the electrode pressure adjusted to produce the proper performance from each electrode.

Another feature of the module of this invention is the ability to tap off desired voltages. For example, five 6.0 volt taps could easily be taken on a 30 volt power module for the operation of low power solenoids. This feature is not possible in the bipolar module which must put all the output power into DC/DC converter(s) to produce ancillary equipment power of other than 30 volts.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a side elevational view of a power module assembly formed in accordance with the invention, with intermediate portions thereof broken away and other portions thereof broken away and shown in section.

FIG. 2 is a transverse sectional view taken generally along the line 2—2 of FIG. 1, and shows generally the details of an individual cell, particularly the configuration of the cell frame and the components mounted therein.

Figure 3:
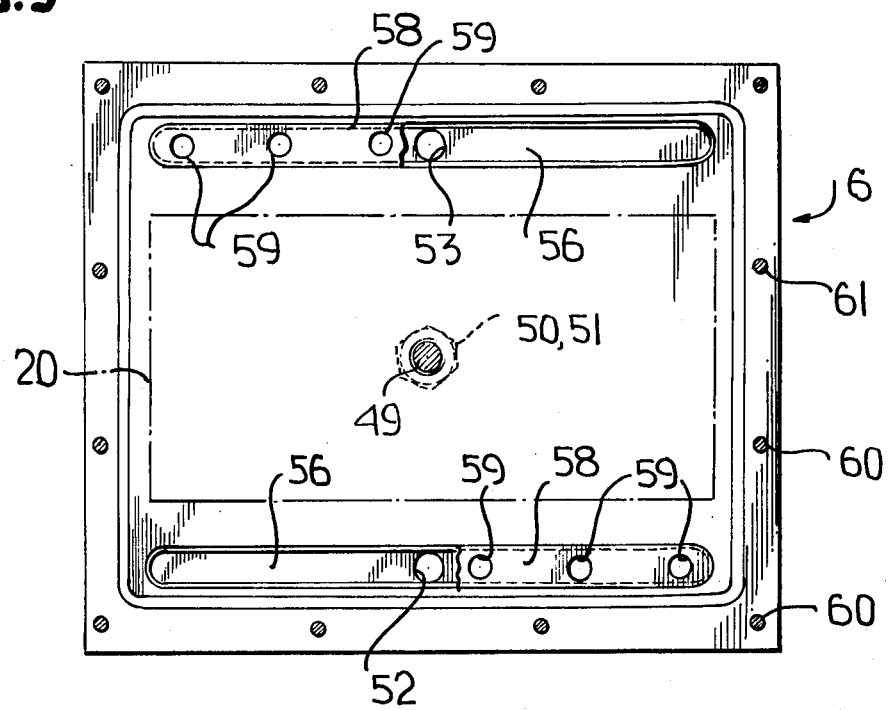
FIG. 3 is a transverse sectional view taken generally along the line 3—3 of FIG. 1, and shows the details of an end plate through which flow of the electrolyte is effected.

Referring now to the drawings in detail, it will be seen that there is illustrated in FIG. 1 the power module assembly which is the subject of this invention, the power module assembly being in the form of an electrochemical battery and being generally identified by the numeral 5. The power module assembly 5 basically includes a pair of end plates 6 and 7 which have disposed therebetween a plurality of substantially identical cells, each identified by the numeral 8. The details of an individual cell will be first described, followed by a general description of the mounting of the cells to form the power module assembly 5.

Each cell 8 includes a cell frame generally identified by the numeral 9. Each cell frame is generally tubular or rectangular in outline and is hollow. One end face of each cell frame 9 is provided with a sealing groove 10 in which a sealing ring 11 is mounted for the purpose of forming a fluid tight seal between adjacent cell frames 9.

Normally, the cell frames 9 will be generally located in vertical planes, and therefore for descriptive purposes only, each cell frame 9 will be described as including a top side 12, a bottom side 13, and a pair of vertical sides 14. The sides of the cell frame 9 define a generally rectangular through opening 15. Mounted in the upper and lower part of each cell frame 9 is a combined anode support and guide 16 in the form of a generally rectangular cross section bar having a thickness slightly less than the thickness of the cell frame 9. By thickness, it is meant the dimension in the direction of cell stacking and in the case of a power module assembly wherein the cells are vertically disposed, it is the horizontal dimension that is being considered.

Each anode supporting guide 16 is positioned within the opening 15 of the cell frame 9 by a pair of support blocks 17, spaced apart in the opening 15. The support blocks 17 are mounted on pins 18 which extend lengthwise of the opening and through apertures 19 in the sides 14 of the cell frame, the pins 18 providing structural support for the sides 14.

A consumable anode 20 is positioned between the anode supporting guides 16 and between the sides 14 of the cell frame 9. In FIG. 1, the anode 20 is illustrated in a partially consumed state.

Each anode supporting guide 16 is provided with a flow distribution and shunt suppression manifold, generally identified by the numeral 21. The manifold assembly, together with the associated anode supporting guide 16, defines a projecting rib 22 which extends in the thickness direction beyond the anode supporting guide 16. The rib 22 may have mounted on the free surface thereof a sealing element 23 for forming a seal with a next adjacent anode supporting guide 16.

Extending generally between the ribs 22 is a screen 24 which forms part of the cathode, the screen 24 being provided for contacting the adjacent face of the anode 20. A screen is chosen as compared to other configurations in that it may have intimate contact with the face of the anode over a large area while at the same time there may be a constant circulation of an electrolyte between the contacting surfaces of the anode and the cathode.

Figure 4:
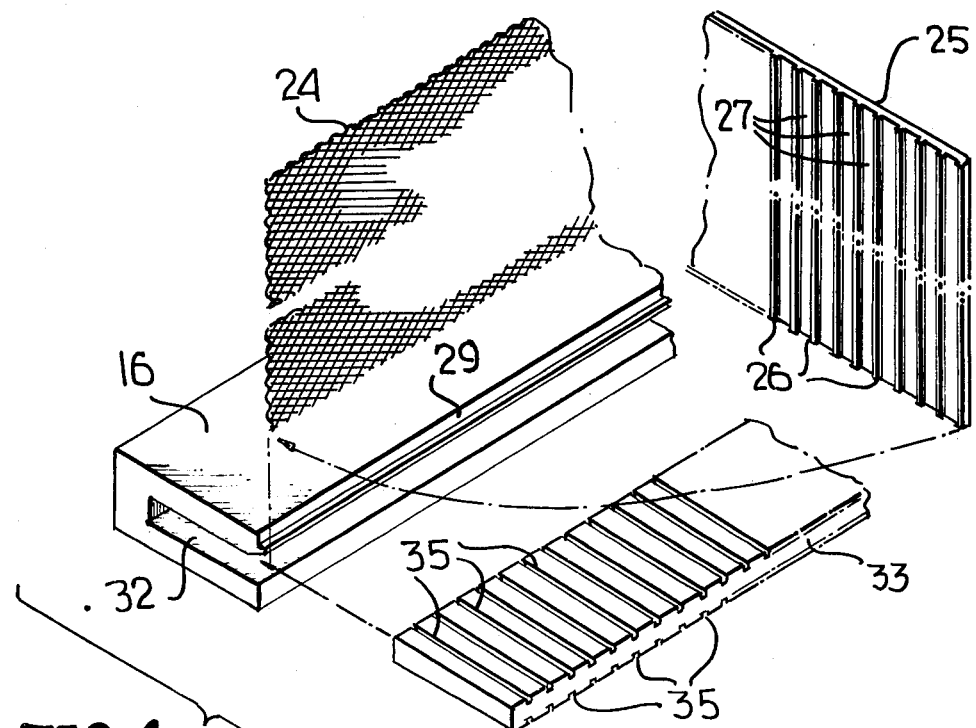
FIG. 4 is a fragmentary exploded perspective view on an enlarged scale showing generally the relationship of the cathode screen and plate and the anode support and the electrolyte flow control member carried by the anode support.

The screen 24 is in abutting contact with a cathode plate 25. As is best shown in FIG. 4, that face of the cathode plate 25 which engages the screen 24 is provided with a plurality of projecting ribs 26 which function to define shallow flow passages 27 for an electrolyte across the face of the screen 24. The ungrooved face of the cathode plate 25 will be in direct contact with the anode or a backing for such anode of a next adjacent cell 8.

In order that the edges of side faces of the anode 20 may be sealed against electrolyte flow and to provide a recess for a rubber-like (MICCROFLEX) coating 20A used to protect the sides of the anode to fold into as the anode is consumed, there is carried by each anode supporting guide 16 a sealing member 28 which is seated in a notch 29 formed in the anode supporting guide in a position wherein the sealing element 28 engages the screen 24 and a horizontally disposed edge or face of the anode 20.

Further, with respect to FIG. 2, it will be seen that the sides 14 of the cell case 9 are provided in that face thereof in which the groove 10 is formed with a notch or recess 30 which is immediately adjacent the opening 15. A sealing element or strip 31 is positioned in each notch 30 and is in sealing contact with the side edges of the screen 24 and with the vertical side faces of the anode. Thus, for all practical purposes, flow of the electrolyte between the vertical side faces of the anode 20 and the sides 14 of the cell frame 9 is prevented.

The screen 24 and cathode plate 25 extend above and below the anode to establish a uniform electrolyte flow before the electrolyte reaches the anode. This is to eliminate anode edge erosion usually experienced in bipolar modules.

Reference is made once again to the manifold assembly where in FIG. 4 in particular it will be seen that each anode supporting guide 16 is provided with a deep channel 32 extending the full length thereof. A channel plate 33 is seated in its respective channel 32 with the dimensions of the channel 32 and the channel plate 33 being such that a flow passage 34 (FIG. 1) is formed at the bottom of the channel. The opposite faces of the channel plate 33 are provided with a plurality of equally spaced parallel grooves 35 which function as flow passages for the electrolyte. These flow passages serve the purpose of providing: (1) equal distribution over the entire width of the screen 24 and the cathode plate 35, (2) control the rate of electrolyte flow to each cell 9, and (3) to reduce electrical shunt losses between cells by requiring the electrolyte to travel a long path with a minimum flow area.

Each cell 8 also includes a pressure device 36 for applying an optimum force under all conditions of erosion of the anode 20 so that the pressure contact between the anode 20 and the screen 24 may remain optimum at all times. Depending on the application the pressure applying device 36 may be a metal bellows or as hereafter assumed a bag of material which resists erosion by the electrolyte. The bag is generally identified by the numeral 37 and has side channels 38 which are folded so that the required expansion of the bag 37 may be effected. In other words, the bag 37 has to expand a distance substantially equal to the thickness of the anode 20. To facilitate the mounting of the bag 37, it may be provided with a backing plate 40 to which it is bonded.

In order that a fluid may be introduced into the bag 37 to effect expansion thereof, the bag is provided with a filler tube 41 which extends exteriorly of the cell case or frame 9 through a bore 42 in the top side 12. The bore 42 is aligned with a like bore 43 in the upper one of each pair of anode supporting guides 16.

It is to be understood that the bag 37 is formed of a suitable rubber material and that the tube 41 may also be formed of the same material. However, the tube 41 must have at least a certain degree of resiliency so that when pulled through the bores 42, 43 it will form seals with the cell case 9 and the upper anode supporting guide 16.

It will be readily apparent that the spacing of the anode supporting guides 16 from the upper and lower sides of the cell case 9 results in the formation of large cross sectional flow passages 44 and 45 above and below the upper and lower anode supporting guides 16, respectively. Each electrolyte flow passage 44, 45 of one cell opens into a like electrolyte flow passage in the next adjacent cell 8.

It is to be understood that the end plate 7 merely functions as a cap plate and is solid except for having therethrough suitable mounting bolt holes (not shown) and a central hole for receiving a terminal 46. As indicated above, the cathode plate 25 of the last cell 8 to the right will be different from the other cathode plates in that it is a terminal cathode plate and carries the terminal 46. The terminal cathode plate 25 will be clamped against the end plate 7 by a nut and washer unit 47 carried by the terminal 46 of which at least the outer part is externally threaded. The terminal 46 will be provided with a second nut and washer assembly 48 for tightly securing an end of a conductor to the terminal 46 in electrically conducting relation.

Each cathode plate 25 has an extension 25A which extends out through a notch in the side 14 in sealed relation to the outside of the cell case 9 to provide an individual cell tap. This external electrical tap is used for individual cell sensing for externally controlled bag 36 pressure and for the operation of ancillary equipment of less than the terminal 46, 49 voltage.

The end plate 6 not only serves to carry a terminal of the power module assembly, but also serves to provide for the supply and return of the electrolyte. First of all, the end plate 6 is provided with a central opening through which a terminal 49 extends. The terminal 49 is connected to the plate 40 and is the anode terminal. The plate 40 is clamped against the end plates 6 by a nut and washer assembly 50 threaded onto a terminal exteriorly threaded portion of the terminal 49. A second nut and washer assembly 51 is provided for securing a second conductor to the terminal 49 in electrically conducting relation.

The end plate 6 is also provided with an inlet passage 52 and a discharge passage 53. The passages 52, 53 are provided with suitable fittings 54, 55, respectively, to which electrolyte supply and return lines (not shown) may be readily coupled. Both the inlet 52 and the discharge 53 open into a flow passage 56 which is elongated transversely of the end plate 6 as is best shown in FIG. 3. The flow passage 56 adjacent the inner face of the end plate 6 is of an increased size to define a peripheral shoulder or step 57. Seated on each step or shoulder 57 and generally closing each flow passage 56 is a baffle 58 having a plurality of flow dispersing openings 59 therethrough. The openings 59 of the baffles 58 open into the respective ones of the electrolyte flow passages 44, 45 as is best shown in FIG. 1.

As is best shown in FIGS. 2 and 3, the end plates 6, 7 and all of the cell cases or frames 9 are provided with bolt openings 60 adjacent the periphery thereof. A bolt 61 extends through each set of aligned openings and suitable head and nut arrangements (not shown) will be provided on the bolts 61 to facilitate the tight clamping of the cells 8 between the end plates 6, 7.

It is to be understood that the tubes 41 of the various bags 37 will be coupled to a common fluid supply. The fluid supply normally will be gaseous and preferably will be in the form of an inert gas. The manner in which the tubes 41 are connected to a supply does not form a part of this invention and therefore no effort has been made to illustrate the same.

It is to be understood that after the anodes 20 have been consumed to the maximum permissible extent, the interior of each cell 8 will be suitably flushed of the electrolyte so that for all practical purposes it will be safe to open the power module assembly 5. It is to be understood that the anodes 20 may be formed of a metal, such as lithium, which is highly corrosive and cannot be handled directly. However, in accordance with the invention the power module assembly 5 is opened and the individual cells 8 are separated from one another, or a suitable removable side plate is provided so that each consumed anode can be replaced by a new anode. The cells 8 are now ready to be reassembled. Except for the purpose of possibly salvaging the non-consumed anode material, in accordance with this invention each anode is so formed wherein it may be disposed of after it has been consumed to the maximum permissible degree. At the most, the anode will be carried by a steel backing plate which is engaged by the bag or bellows.

When the pressure applying device is in the form of metallic bellows, the bellows provide the electrical connection between adjacent power cells. On the other hand, when the pressure applying device is in the form of a bag formed of non-conductive material, it is necessary that there be associated with the bag a pair of end plates 62, 63 which are interconnected by a flexible cable or strap 64. It is to be understood that in an intermediate cell the plate 62 will engage the cathode plate 25 and the plate 63 will engage the anode 20.

Although only a preferred embodiment of the invention has been specifically illustrated and described herein, it is to be understood that minor variations may be made in the power module assembly without departing from the spirit and scope of the invention as defined by the appended claims.

I claim:

1. A power module assembly comprising a pair of spaced end plates and a plurality of identical power cells mounted between end plates, each of said power cells comprising a tubular cell frame, means for sealing each cell frame to an adjacent cell frame, each cell frame including first and second sides, an anode guide means positioned within each cell frame in spaced relation to each first side and defining with each adjacent cell frame first side an electrolyte flow passage, an expendable anode mounted between said anode guide means for sliding movement through said cell frame, a screen supported on said anode guide means and engaged by a face of said anode, a cathode plate supported on said anode guide means in face-to-face engagement with said screen, electrolyte flow control means carried by said anode guide means for controlling the flow of electrolyte from one of said electrolyte flow passages to said screen and from said screen to the other of said electrolyte flow passages, a force exerting means within each cell frame and reacting on an associated anode for exerting a constant force on said associated anode to hold each anode in constant pressure contact with a respective one of said screens, and manifold means coupled to said electrolyte flow passages for supplying to and receiving electrolyte therefrom.

2. The power module assembly of claim 1 wherein said anode guides are spaced from said cell frame first sides by spacers.

3. The power module assembly of claim 1 wherein said anode guides are spaced from said cell frame first sides by spacers carried by said cell frame second sides.

4. The power module assembly of claim 1 wherein said electrolyte flow control means includes a rib projecting axially of each power cell for forming a seal with a next adjacent one of said power cell and end plate, the extent of projection of said rib corresponding generally to the combined thickness of said screen and said cathode plate, and said rib forming means for positioning said screen and said cathode plate.

5. The power module assembly of claim 4 together with means for effecting uniform electrolyte flow around said rib and throughout the length of said rib.

6. The power module assembly of claim 4 wherein said rib is defined by a separately formed channel plate seated in a channel formed in a respective one of said anode guides.

7. The power module assembly of claim 6 together with means for effecting uniform electrolyte flow around said channel plate within said channel throughout the length of said channel plate.

8. The power module assembly of claim 7 wherein said means for effecting uniform electrolyte flow includes plural flow passages along opposite sides of said channel plate.

9. The power module assembly of claim 1 wherein said force exerting means includes an expansible member having a fluid supply disposed externally of said cell frame.

10. The power module assembly of claim 1 wherein said force exerting means includes an expansible bag member having a fluid supply disposed externally of said cell frame, said bag member having a supply tube extending through aligned apertures in one of said anode guides and said cell frame.

11. The power module assembly of claim 1 wherein said manifold means includes one of said plates being a flow plate carrying an inlet and a discharge.

12. The power module assembly of claim 11 wherein associated with each of said discharge and inlet is a flow passage extending transversely of said assembly for substantially the full internal width of the cell frame, and a flow distributing baffle is positioned in each flow passage.

13. The power module assembly of claim 1 wherein at least certain of said cathode plates have exposed top extensions for obtaining selected voltages less than the overall voltage of said power module assembly.

14. The power module assembly of claim 1 wherein said guides are of a configuration to establish uniform electrolyte flow in advance of said anode for eliminating anode edge erosion.

15. The power module assembly of claim 1 wherein said electrolyte control means includes a manifold assembly of a construction for controlling electrolyte flow in a manner to reduce shunt losses.

* * * * *